(12) United States Patent
Gniadek

(10) Patent No.: US 10,488,599 B2
(45) Date of Patent: Nov. 26, 2019

(54) OPTICAL INTERCONNECTION SYSTEM AND MOUNTING BRACKET FOR SUPPORTING A MATED OPTICAL FIBER FERRULE ASSEMBLY

(71) Applicant: SENKO Advanced Components, Inc., Marlborough, MA (US)

(72) Inventor: Jeffrey Gniadek, Northbridge, MA (US)

(73) Assignee: Senko Advanced Components, Inc., Marlborough, MA (US)

( * ) Notice: Subject to any disclaimer, the term of this patent is extended or adjusted under 35 U.S.C. 154(b) by 0 days.

(21) Appl. No.: 15/987,922

(22) Filed: May 24, 2018

(65) Prior Publication Data

US 2018/0356601 A1 Dec. 13, 2018

Related U.S. Application Data

(60) Provisional application No. 62/516,635, filed on Jun. 7, 2017.

(51) Int. Cl.
*G02B 6/38* (2006.01)
*G02B 6/42* (2006.01)

(52) U.S. Cl.
CPC ......... *G02B 6/3835* (2013.01); *G02B 6/3897* (2013.01); *G02B 6/428* (2013.01); *G02B 6/4292* (2013.01)

(58) Field of Classification Search
CPC .... G02B 6/3835; G02B 6/3897; G02B 6/428; G02B 6/4292

USPC .......................................................... 385/147
See application file for complete search history.

(56) References Cited

U.S. PATENT DOCUMENTS

| 6,505,976 | B1 * | 1/2003 | Grois | G02B 6/3869 |
| | | | | 385/60 |
| 7,084,496 | B2 | 8/2006 | Benner et al. | |
| 7,150,567 | B1 * | 12/2006 | Luther | G02B 6/3851 |
| | | | | 385/78 |
| 8,437,584 | B2 | 5/2013 | Matsuoka et al. | |
| 8,478,094 | B2 * | 7/2013 | Hsu | G02B 6/4214 |
| | | | | 385/47 |
| 9,612,405 | B2 | 4/2017 | Aoki et al. | |
| 9,645,323 | B2 | 5/2017 | Gniadek et al. | |
| 9,720,188 | B2 * | 8/2017 | Barwicz | G02B 6/3893 |
| 9,755,382 | B2 | 9/2017 | Gniadek | |
| 2008/0166090 | A1 * | 7/2008 | Kiani | G02B 6/3897 |
| | | | | 385/89 |

(Continued)

*Primary Examiner* — Akm E Ullah
(74) *Attorney, Agent, or Firm* — Edward S. Jarmolowicz, Esq.

(57) ABSTRACT

The present invention provides a circuit board-mounted optical interconnection system comprising a mounting bracket for holding a board-based first optical connector ferrule; a ferrule alignment housing for mating the first optical connector ferrule with a second optical connector ferrule to form a mated ferrule sub-assembly; wherein the mounting bracket comprises a pair of curved portions; the mated ferrule sub-assembly comprises one or more pivoting features for engaging with the curved portions such that the mated ferrule sub-assembly is rotatable with respect to the mounting bracket. The present invention makes mating and un-mating of the connector ferrules easier, particularly in confined working spaces as with racks in telecommunication cabinets.

12 Claims, 7 Drawing Sheets

(56) References Cited

U.S. PATENT DOCUMENTS

2014/0044395 A1* 2/2014 Waldron .............. G02B 6/38
385/60
2014/0112628 A1* 4/2014 Keenum .............. G02B 6/428
385/89

* cited by examiner

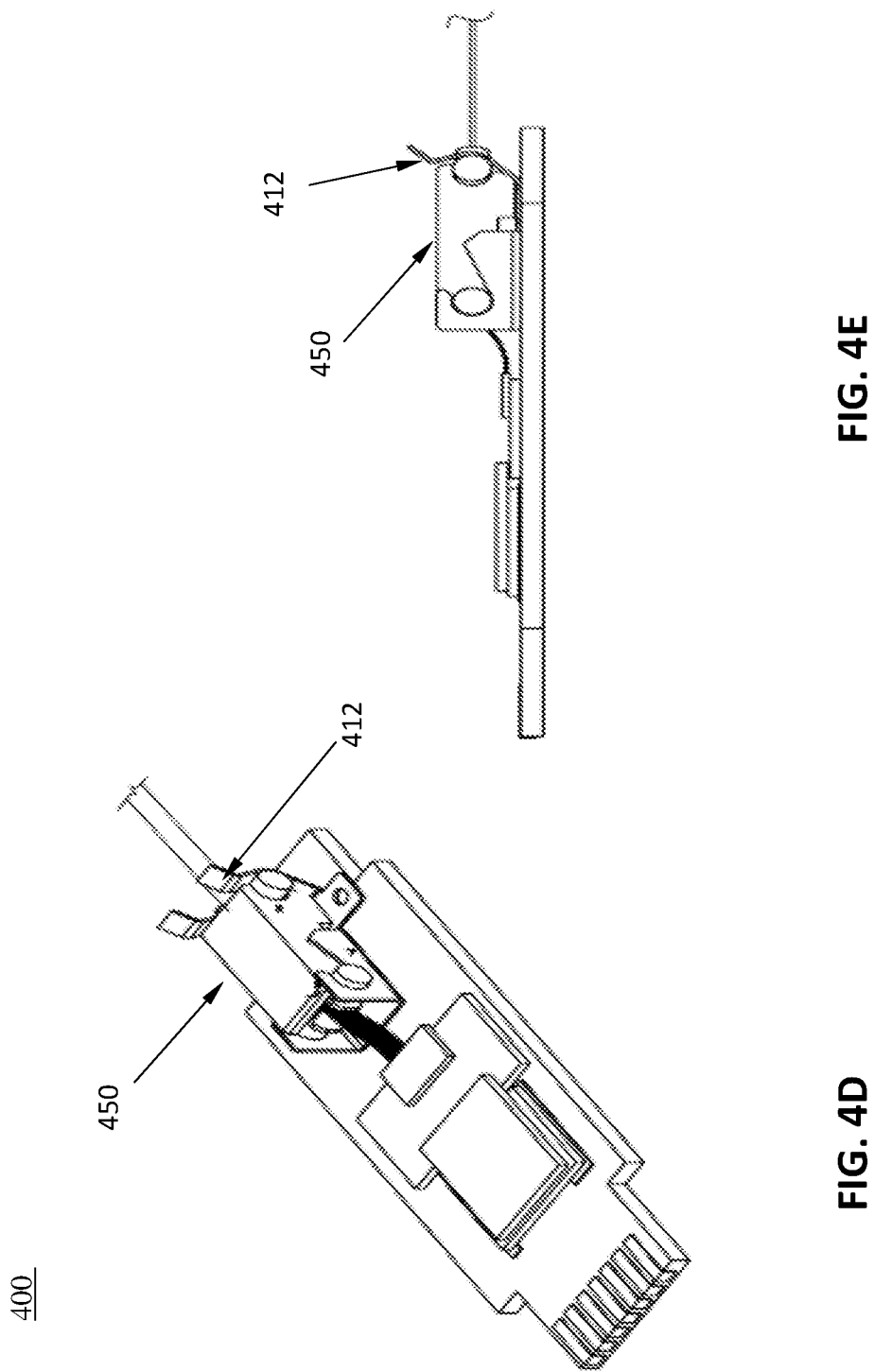

US 10,488,599 B2

OPTICAL INTERCONNECTION SYSTEM AND MOUNTING BRACKET FOR SUPPORTING A MATED OPTICAL FIBER FERRULE ASSEMBLY

CROSS-REFERENCE TO RELATED APPLICATION

The present invention claims priority to U.S. Provisional Patent Application No. 62/516,635 filed Jun. 7, 2017, the disclosure of which is incorporated by reference herein.

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention relates to fiber optic connectors and, more particularly, to fiber optic connectors mounted on printed circuit boards.

BACKGROUND OF THE INVENTION

Fiber optic cables typically interconnect to printed circuit boards or modules when there is a need to route light to active or passive optical devices. In these situations, there is often limited space as printed circuit boards may be stacked in arrays with many neighboring boards. Therefore, low profile connections may be used. FIG. 1 shows a prior art system for interconnecting fiber optic cables to printed circuit boards. A fiber optic cable is interconnected to a board-mounted device that has a connectorized cable extending therefrom. The interconnection portion is mounted to a clip that may be soldered or screwed to the printed circuit board. Although this solution provides a low-profile interconnection, there are situations where the fiber length from the active or passive component is very short, limiting the ability to manipulate an interconnection component. Thus, there is a need in the art for an improved circuit board-mounted interconnection component that can function with very short fiber cable lengths while maintaining connection between single-fiber or multiple-fiber ferrules.

SUMMARY OF THE INVENTION

It is one of the objectives of the present invention to provide a circuit board-mounted optical interconnection system that can hold two single-fiber or multiple-fiber ferrules and function to provide a connection with very short fiber cable length(s). The system may hold two ferrules in a mated condition when inserted into/onto a circuit board mounted clip. The system may also provide the necessary spring force required for positive physical contact (PC) of the mated ferrule end faces. The system can be used to mate optical connector ferrules such as single fiber ferrules (using an internal alignment sleeve) as well as multiple fiber ferrules such as the mechanical transfer (MT) ferrule.

According to one aspect of the present invention, the circuit board-mounted optical interconnection system comprises a mounting bracket which is mounted on a printed circuit board for holding a board-based first optical connector ferrule; a ferrule alignment housing for mating the first optical connector ferrule with a second optical connector ferrule to form a mated ferrule sub-assembly; wherein the mounting bracket comprises a pair of curved portions; the mated ferrule sub-assembly comprises one or more pivoting features for engaging with the curved portions such that the mated ferrule sub-assembly is rotatable with respect to the mounting bracket. The pivoting features may be in disc shape and formed at both ends of the mated ferrule sub-assembly respectively as to be symmetrical so that either end can snap into the mounting bracket.

One of the advantages of the present invention is that it introduces a minimum of one pivoting axis portion in the mounting bracket and a minimum of one coinciding pivot feature on the mated ferrule sub-assembly so that the mated ferrule sub-assembly can rotate upwards or downwards. This rotation makes mating and un-mating of the connector ferrules easier, particularly in confined working spaces as with racks in telecommunication cabinets.

BRIEF DESCRIPTION OF THE DRAWINGS

Embodiments of the invention are described in more detail hereinafter with reference to the drawings, in which:

FIG. 4D shows an isometric view of the circuit board-mounted optical interconnection system of FIG. 4A after the connector ferrules are hold in place on the circuit board;

FIG. 4E shows the side view of the circuit board-mounted optical interconnection system of FIG. 4A after the connector ferrules are hold in place on the circuit board;

DETAILED DESCRIPTION

In the following description, circuit board-mounted optical interconnection systems and the likes are set forth as preferred examples. It will be apparent to those skilled in the art that modifications, including additions and/or substitutions may be made without departing from the scope and spirit of the invention. Specific details may be omitted so as not to obscure the invention; however, the disclosure is written to enable one skilled in the art to practice the teachings herein without undue experimentation.

Figure 1:
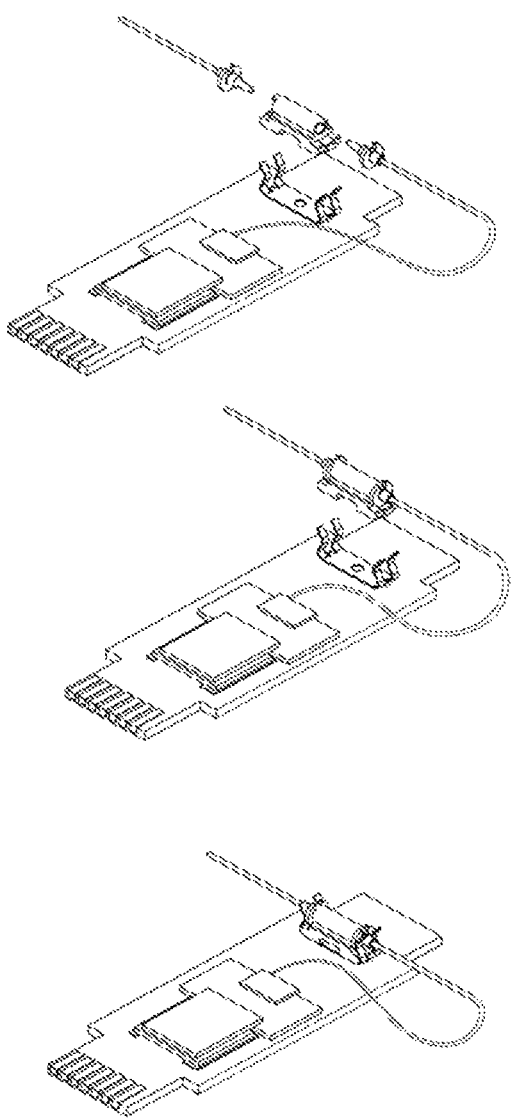
FIG. 1 depicts a prior art system for interconnecting fiber optic cables to printed circuit boards.
Figure 2A:
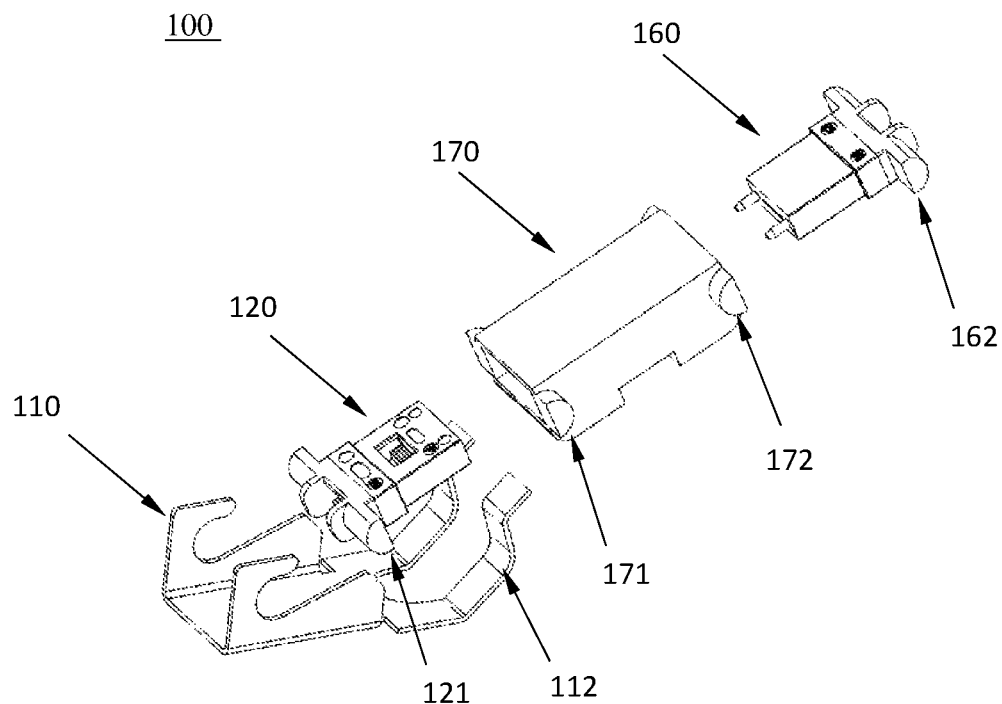
FIG. 2A depicts a circuit board-mounted optical interconnection system according to one embodiment of the present invention.
Figure 2B:
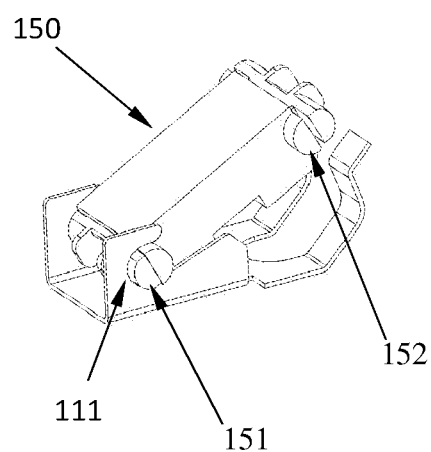
FIG. 2B depicts the circuit board-mounted optical interconnection system of FIG. 2A after assembling the mated ferrule sub-assembly.

FIGS. 2A-2B depict a circuit board-mounted optical interconnection system 100 according to one embodiment of the present invention. As shown in FIG. 2A, the interconnection system 100 includes a mounting bracket 110; a board-based optical connector ferrule 120; and a ferrule alignment housing 170 for mating the board-based optical connector ferrule 120 with an optical connector ferrule 160 to form a mated ferrule sub-assembly 150, which is best seen in FIG. 2B. The mounting bracket 110 may include resilient arms 112 acting as a spring to apply a compressive force to secure the connector ferrules when they are assembled together.

FIG. 2B shows the circuit board-mounted optical interconnection system 100 after assembling the mated ferrule sub-assembly 150. It can be seen that the mounting bracket 110 may further include curved portions 111. Correspondingly, the mated ferrule sub-assembly 150 may include pivoting features 151 for engaging the curved portions 111 such that the mated ferrule sub-assembly 150 is rotatable with respect to the mounting bracket through pivots that extend from the base of the board-based optical connector ferrule 120. Preferably, the mated ferrule sub-assembly 150 may include pivoting features 151, 152 on both ends respectively as to be symmetrical so that either end can snap into the mounting bracket. In this embodiment, the pivoting features 151 are in disc shape and formed with protrusions 171 (as shown in FIG. 2A) at a first end of the ferrule alignment housing 170 and protrusions 121 (as shown in FIG. 2A) at a flange of the board-based optical connector ferrule 120, while the pivoting features 152 are in disc shape and formed with protrusions 172 (as shown in FIG. 2A) at a second end of the ferrule alignment housing 170 and protrusions 162 (as shown in FIG. 2A) at a flange of the optical connector ferrule 160.

Although the shape of protrusions 171 and 121 are depicted as semicircular in FIG. 2A, it should be appreciated by those skilled in the art that the protrusions 171 and 121 can have any other shapes acting as mutual-supplementary parts of the pivoting features 151 of the mated ferrule sub-assembly. Similarly, the protrusions 172 and 162 can have any other shapes acting as mutual-supplementary parts of the pivoting features 152 of the mated ferrule sub-assembly.

Figure 3A:
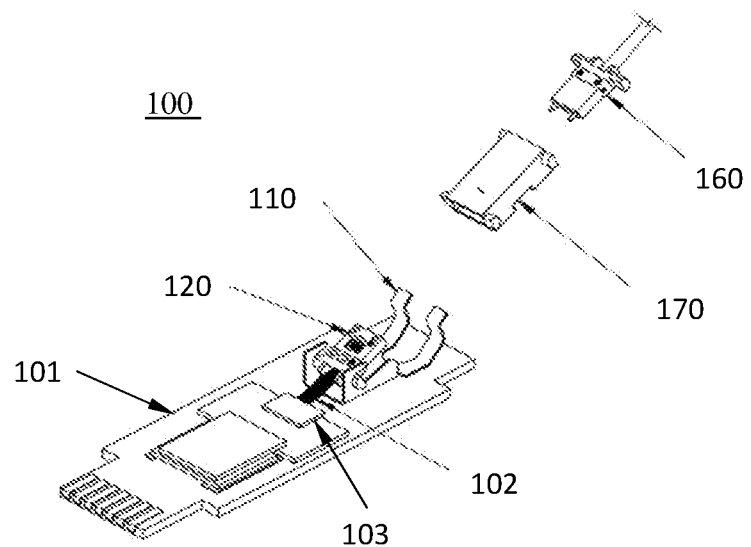
FIG. 3A shows an isometric view of the circuit board-mounted optical interconnection system of FIG. 2A before the connector ferrules are mated.
Figure 3B:
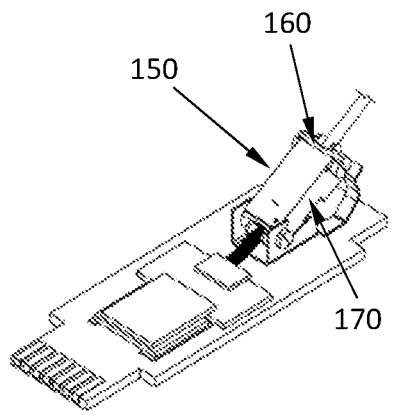
FIG. 3B shows an isometric view of the circuit board-mounted optical interconnection system of FIG. 3A after the connector ferrules are mated.
Figure 3C:
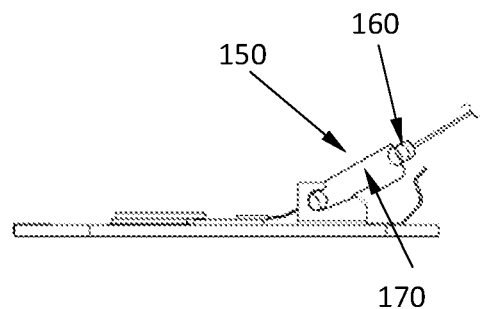
FIG. 3C shows a side view of the circuit board-mounted optical interconnection system of FIG. 3A after the connector ferrules are mated.
Figure 3D:
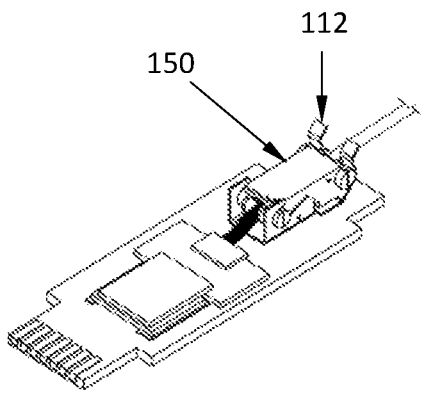
FIG. 3D shows an isometric view of the circuit board-mounted optical interconnection system of FIG. 3A after the connector ferrules are hold in place on the circuit board.
Figure 3E:
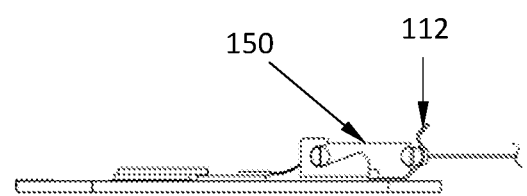
FIG. 3E shows a side view of the circuit board-mounted optical interconnection system of FIG. 3A after the connector ferrules are hold in place on the circuit board.

FIGS. 3A-3E show the operation of the circuit board-mounted optical interconnection system in more detail. The mounting bracket 110 is mounted to the printed circuit board 101 for holding the board-based optical connector ferrule 120. The board-based optical connector ferrule 120 is connected by a short fiber 102 to a board-mounted active or passive optical component 103. As shown in FIG. 3A, before mating, the board-based optical connector ferrule 120 is rotated upwards and inserted into the ferrule alignment housing 170. As shown in FIGS. 3B and 3C, the connector ferrule 160 is then inserted fully into the ferrule alignment housing 170 to form the mated ferrule sub-assembly 150. As shown in FIGS. 3C and 3D, the ferrule sub-assembly 150 is then rotated downwards into the mounting bracket. The resilient arms 112 of the mounting bracket then "snap" onto the mated ferrule sub-assembly 150, hold it rigidly in place on the circuit board and also apply the specific end face mating pressure on the two mated connector ferrules.

To un-mate the two connector ferrules, the above-said process is reversed. The ferrule sub-assembly 150 is firstly rotated upwards from the mounting bracket. Then connector ferrule 160 is pulled out from the ferrule alignment housing 170 and un-mated from the board-based optical connector ferrule 120.

Figure 4A:
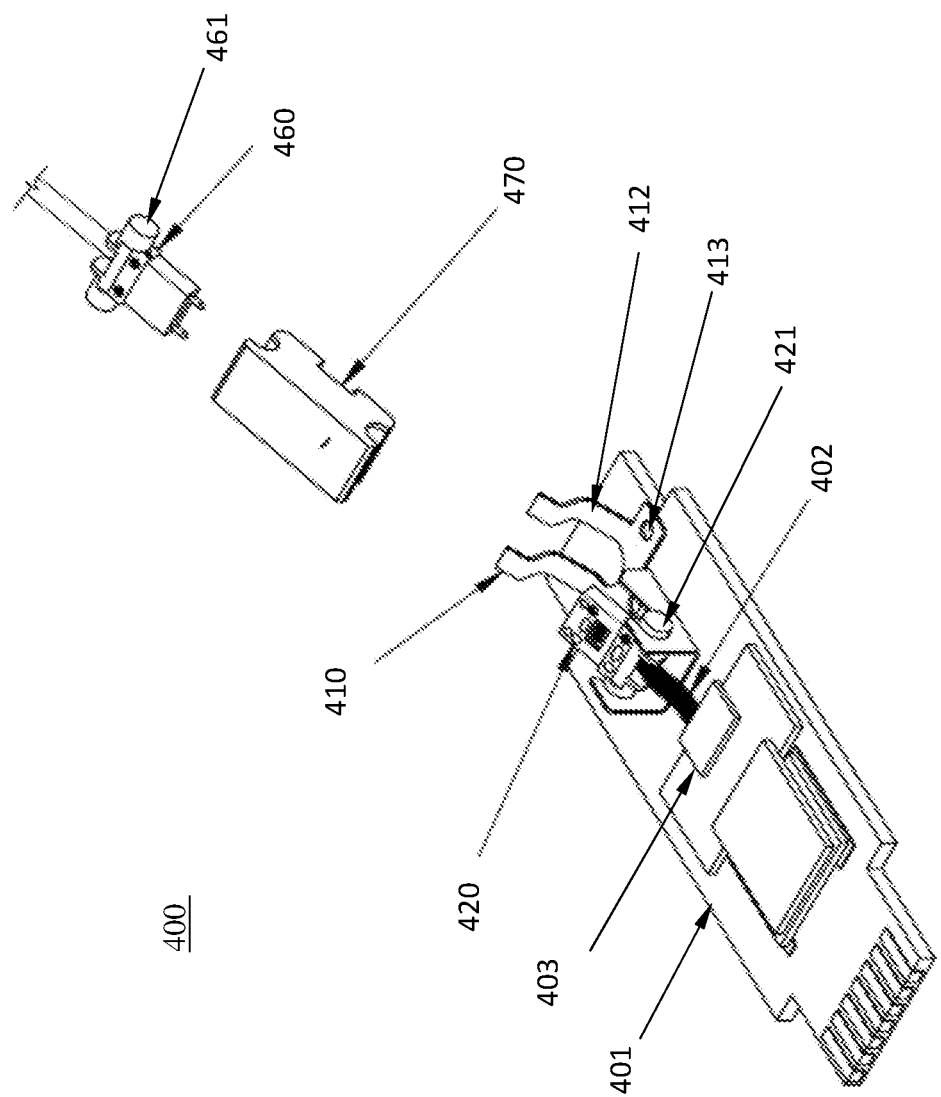
FIG. 4A shows an isometric view of the circuit board-mounted optical interconnection system according to another embodiment of the present invention before the connector ferrules are mated.
Figure 4C:
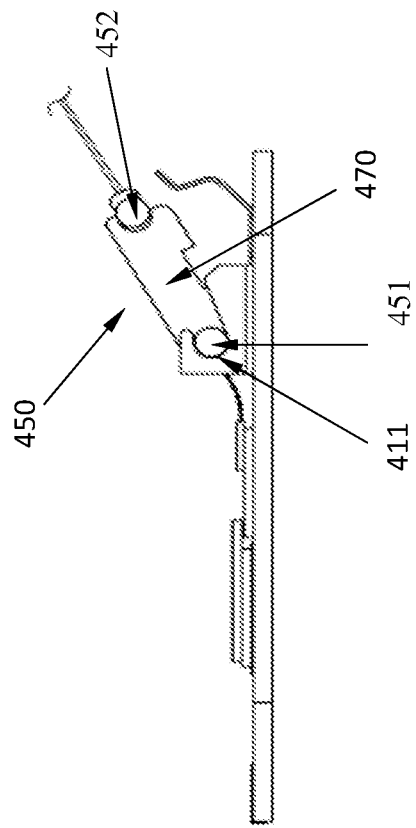
FIG. 4C shows a side view of the circuit board-mounted optical interconnection system of FIG. 4A after the connector ferrules are mated.
Figure 4B:
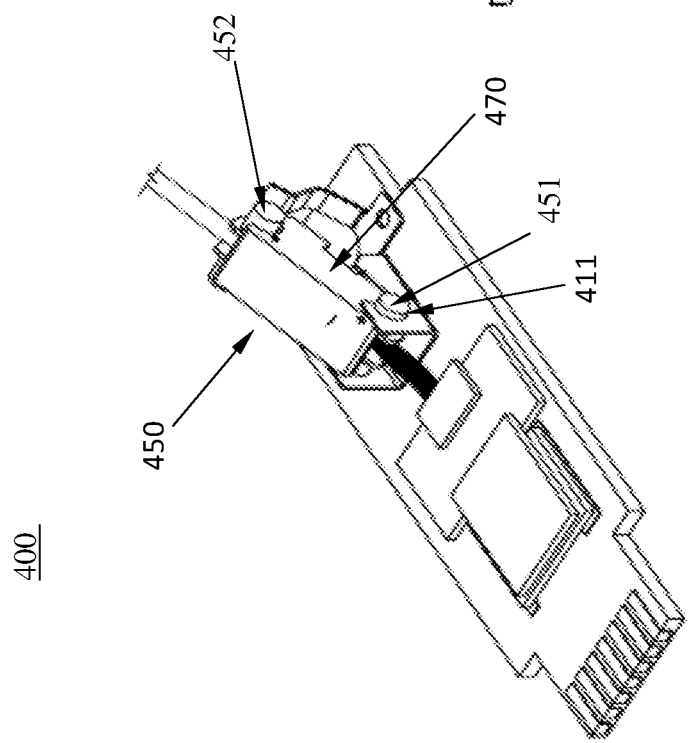
FIG. 4B shows an isometric view of the circuit board-mounted optical interconnection system of FIG. 4A after the connector ferrules are mated.

FIGS. 4A-4E show a circuit board-mounted optical interconnection system 400 according to another embodiment of the present invention wherein the pivot features are in the ferrule flange itself. As shown in FIG. 4A, the circuit board-mounted optical interconnection system 400 includes a mounting bracket 410, which is mounted to the printed circuit board 401, for holding a board-based optical connector ferrule 420. The board-based optical connector ferrule 420 is connected by a short fiber 402 to a board-mounted active or passive optical component 403. The circuit board-mounted optical interconnection system further comprises a ferrule alignment housing 470 for mating the board-based optical connector ferrule 420 with an optical connector ferrule 460 to form a mated ferrule sub-assembly 450, which is best seen in FIGS. 4B and 4C. The mounting bracket 410 includes resilient arms 412 acting as a spring to apply a compressive force to secure the connector ferrules when they are assembled together. Optionally, the mounting bracket 410 further includes screw holes 413 and/or soldering points to attach it to the circuit board.

As shown in FIGS. 4B and 4C, the mounting bracket 410 further includes curved portions 411. Correspondingly, the mated ferrule sub-assembly 450 includes pivoting features for engaging with the curved portions 411 such that the mated ferrule sub-assembly 450 is rotatable with respect to the mounting bracket through pivots that extend from the base of the board-based optical connector ferrule 420. Preferably, the mated ferrule sub-assembly 450 may include pivoting discs 451, 452 on both ends respectively as to be symmetrical so that either end can snap into the mounting bracket. The pivoting discs 451 at the first end of the mated ferrule sub-assembly 450 are formed with protrusions 421 (as shown in FIG. 4A) at a flange of the board-based optical connector ferrule 420 while the pivoting discs 452 at the second end of the mated ferrule sub-assembly are formed with protrusions 461 (as shown in FIG. 4A) at a flange of the optical connector ferrule 460.

FIGS. 4A-4E depict the operation of the circuit board-mounted optical interconnection system 400. As shown in FIG. 4A, before mating, the board-based optical connector ferrule 420 is rotated upwards and inserted into the ferrule alignment housing 470. As shown in FIGS. 4B and 4C, the connector ferrule 460 is then inserted fully into the ferrule alignment housing 470 to form the mated ferrule sub-assembly 450. As shown in FIGS. 4D and 4E, the ferrule sub-assembly 450 is then rotated downwards into the mounting bracket. The resilient arms 412 of the mounting bracket then "snap" onto the mated ferrule sub-assembly 450, hold it rigidly in place on the circuit board and also apply the specific end face mating pressure on the two mated connector ferrules.

Figure 5:
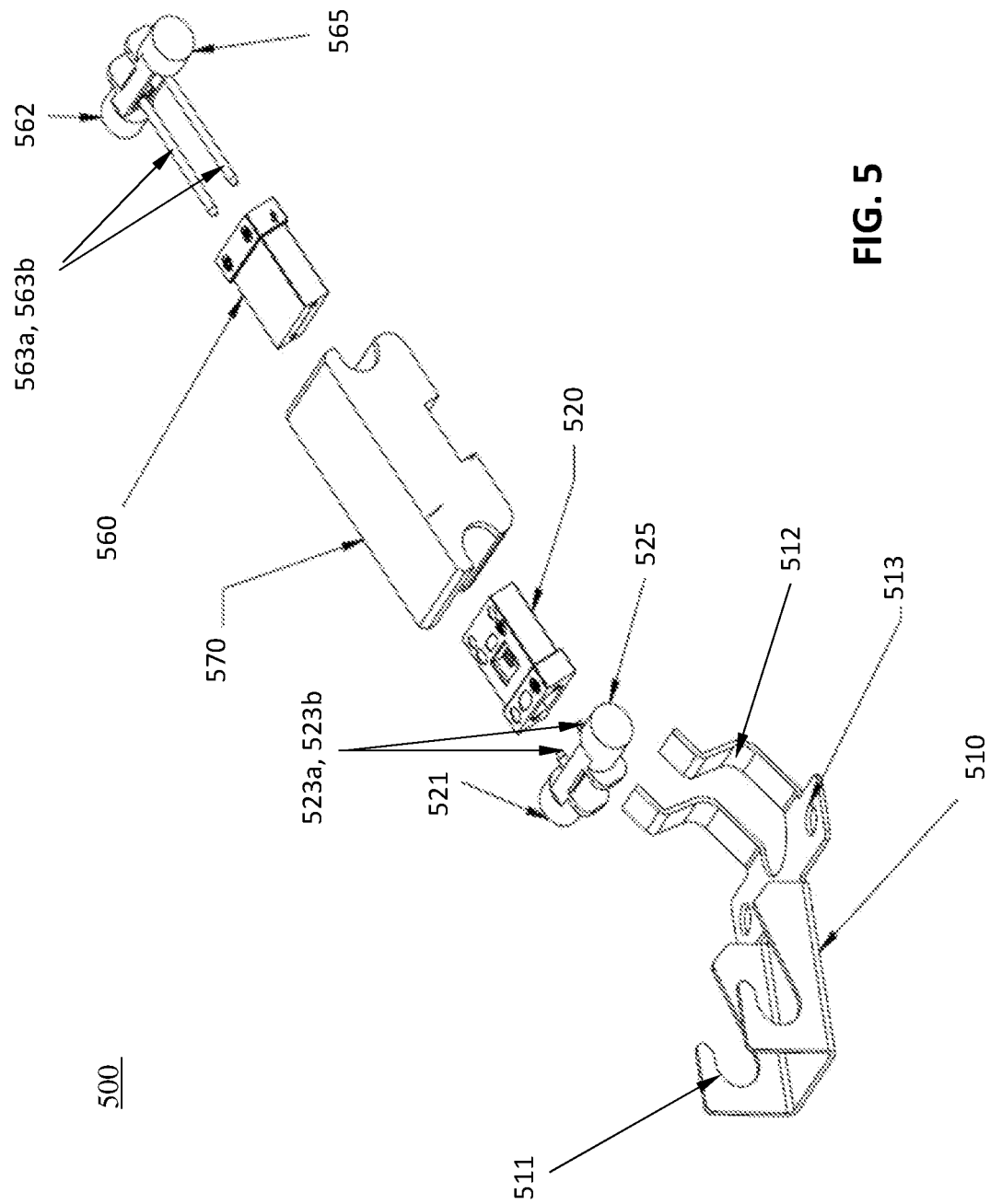
FIG. 5 shows a circuit board-mounted optical interconnection system according to another embodiment of the present invention.

FIG. 5 shows a circuit board-mounted optical interconnection system 500 according to another embodiment of the present invention. The circuit board-mounted optical interconnection system 500 includes a mounting bracket 510; a board-based optical connector ferrule 520 and a ferrule alignment housing 570 for mating the board-based optical connector ferrule 520 with an optical connector ferrule 560 to form a mated ferrule sub-assembly. The mounting bracket 510 includes resilient arms 512 acting as a spring to apply a compressive force to secure the connector ferrules when they are assembled together. Optionally, the mounting bracket 510 includes screw holes 513 and/or soldering points to attach it to the circuit board.

The mounting bracket 510 further includes curved portions 511. The mated ferrule sub-assembly include pivoting features at both ends for engaging with the curved portions such that the mated ferrule sub-assembly 550 is rotatable with respect to the mounting bracket through pivots that extend from the base of the optical connector ferrules. Similar to the embodiment of FIGS. 4A-4C, the pivoting features of the mated ferrule sub-assembly are formed with protrusions 521 at a flange 525 of the board-based optical connector ferrule 520 and protrusions 562 at a flange 565 of the optical connector ferrule 560, respectively.

Optionally, the ferrule flanges 525, 565 may be single elements which are separable from the ferrules 520, 560 respectively. The ferrule flanges 525 may include a pair of guide pins 523a, 523b. The board-based optical connector ferrule 520 may include receiving apertures (not shown) configured to receive the guide pins 523a, 523b that extend into the ferrule 520. Similarly, the ferrule flanges 565 may include a pair of guide pins 563a, 563b. The optical connector ferrule 560 may include receiving apertures (not shown) configured to receive the guide pins 563a, 563b that extend into the ferrule 560. It should be appreciated by those skilled in the art that various configurations may be used to mate the ferrule flanges and the ferrules. For example, the ferrules may include guide pins and the ferrule flanges may include receiving apertures to receive the guide pins that extend into the ferrule flanges.

An ordinarily skilled person in the art can appreciate that by following the principal of the present invention, a version of a circuit board-mounted optical interconnection system can be derived without departing from the scope and spirit of the invention. It is also understood that although the embodiments of the present invention described herein are related to MPO/MT based optical ferrules, the present invention can be adapted to other types of ferrules such as LC based connector ferrule or a thin MT ferrule to enhance the low-profile nature of the interconnection. It is also understood that although the optical interconnection systems described herein are mounted to printed circuit boards, the present invention can be adapted to other types of substrates or platforms.

The foregoing description of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated.

The invention claimed is:

1. An optical interconnection system comprising:
   a mounting bracket for holding a board-based first optical connector ferrule;
   a ferrule alignment housing for mating the first optical connector ferrule with a second optical connecter ferrule to form a mated ferrule sub-assembly comprising one or more pivoting features;
   wherein the mounting bracket comprises a pair of curved portions; the curved portions being shaped to receive said one or more pivoting features of the mated ferrule subassembly such that the pair of curved portions constrain the mated ferrule sub-assembly to rotate with respect to the mounting bracket about an axis.

2. The optical interconnection system of claim 1, wherein the pivoting features includes a first pair of pivoting discs formed at a first end of the mated ferrule sub-assembly.

3. The optical interconnection system of claim 2, wherein the mated ferrule sub-assembly includes a second pair of pivoting discs formed at a second end opposing to the first end of the mated ferrule sub-assembly.

4. The optical interconnection system of claim 2, wherein each of the first pair of pivoting discs are formed by combing each of a pair of protrusions at a flange of the first optical connector ferrule and each of a pair of protrusions at a first end of the ferrule alignment housing.

5. The optical interconnection system of claim 3, wherein each of the second pair of pivoting discs are formed by combining each of a pair of protrusions at a flange of the second optical connector ferrule and each of a pair of protrusions at a second end of the ferrule alignment housing.

6. The optical interconnection system of claim 2, wherein the first pair of pivoting discs are formed by a pair of protrusions at a flange of the first optical connector ferrule.

7. The optical interconnection system of claim 3, wherein the second pair of pivoting discs are formed by a pair of protrusions at a flange of the second optical connector ferrule.

8. The optical interconnection system of claim 1, wherein the first optical connector ferrule includes a flange which is separable from the first optical connector ferrule;
   wherein the flange includes a pair of guide pins; and
   the first optical connector ferrule further includes a pair of receiving apertures configured to receive the guide pins.

9. The optical interconnection system of claim 1, wherein the second optical connector ferrule includes a flange which is separable from the first optical connector ferrule;
   wherein the flange includes a pair of guide pins; and
   the second optical connector ferrule further includes a pair of receiving apertures configured to receive the guide pins.

10. The optical interconnection system of claim 1, wherein the mounting bracket further includes one or more resilient arms acting as springs to apply compressive force to secure the mated ferrule sub-assembly.

11. The optical interconnection system of claim 1, wherein the mounting bracket further includes one or more screw holes and/or soldering points to attach it to a printed circuit board.

12. The optical interconnection system of claim 11 in combination with the printed circuit board.

* * * * *